(12) United States Patent
Aurousseau

(10) Patent No.: US 9,394,832 B2
(45) Date of Patent: Jul. 19, 2016

(54) AERONAUTICAL ENGINE WITH COOLING OF AN ELECTRIC STARTING DEVICE

(75) Inventor: Christian Aurousseau, Rubelles (FR)

(73) Assignee: SNECMA, Paris (FR)

( * ) Notice: Subject to any disclaimer, the term of this patent is extended or adjusted under 35 U.S.C. 154(b) by 799 days.

(21) Appl. No.: 13/201,553

(22) PCT Filed: Jan. 15, 2010

(86) PCT No.: PCT/FR2010/050060
§ 371 (c)(1),
(2), (4) Date: Aug. 15, 2011

(87) PCT Pub. No.: WO2010/092267
PCT Pub. Date: Aug. 19, 2010

(65) Prior Publication Data
US 2011/0296846 A1 Dec. 8, 2011

(30) Foreign Application Priority Data

Feb. 16, 2009 (FR) ..................................... 09 50976

(51) Int. Cl.
*F02C 7/275* (2006.01)
*F02C 7/236* (2006.01)
*F02C 7/14* (2006.01)

(52) U.S. Cl.
CPC . *F02C 7/275* (2013.01); *F02C 7/14* (2013.01); *F02C 7/236* (2013.01); *Y02T 50/671* (2013.01); *Y02T 50/675* (2013.01)

(58) Field of Classification Search
CPC .............. F02C 7/14; F02C 7/18; F02C 7/22; F02C 7/26; F02C 7/32; F02C 7/042; F02C 7/185; F02C 7/224; F02C 7/232; F02C 7/236; F02C 7/275; F02C 7/277; F02C 9/16; F02C 9/26; F02C 9/28; F02C 9/32; F02K 3/00; F05D 2270/64; Y02T 60/671; Y02T 60/675; B64D 33/08; F23R 3/32
USPC ........................... 60/39.83, 39.281, 736, 788
See application file for complete search history.

(56) References Cited

U.S. PATENT DOCUMENTS 3,080,716 A * 3/1963 Cummings ............... F02C 7/14
123/196 AB
3,733,816 A 5/1973 Nash et al.
(Continued)

FOREIGN PATENT DOCUMENTS

| EP | 1 953 899 | 8/2008 |
|---|---|---|
| FR | 1 112 758 | 3/1956 |
| FR | 0760065 A * | 12/2007 |

OTHER PUBLICATIONS

International Search Report issued May 10, 2010 in PCT/FR10/050060 filed Jan. 15, 2010.

*Primary Examiner* — Ehud Gartenberg
*Assistant Examiner* — Jared W Pike
(74) *Attorney, Agent, or Firm* — Oblon, McClelland, Maier & Neustadt, L.L.P

(57) ABSTRACT

An aeronautical engine including a fuel pumping device including a high pressure fuel pump including an inlet connected to a low pressure fuel conduit and an outlet connected to a main circuit for feeding high pressure fuel, an electric device starting the engine, and a device cooling the electric starting device connected to the pumping device to ensure cooling by circulation of fuel. The cooling device is supplied with fuel by a pump that includes an inlet connected to the pumping device, upstream from the high pressure pump, and that is driven by an electric motor independently of the high pressure pump.

6 Claims, 2 Drawing Sheets

(56) References Cited

U.S. PATENT DOCUMENTS

| | | | | |
|---|---|---|---|---|
| 3,918,253 A | * | 11/1975 | Smith | 60/39.281 |
| 4,104,873 A | | 8/1978 | Coffinberry | |
| 4,205,945 A | * | 6/1980 | Davis | 417/53 |
| 5,118,258 A | * | 6/1992 | Martin | 417/3 |
| 7,401,461 B2 | * | 7/2008 | Eick et al. | 60/39.091 |
| 2007/0217905 A1 | * | 9/2007 | Bouiller | F01D 9/065 415/122.1 |
| 2008/0238098 A1 | | 10/2008 | Becquerelle et al. | |
| 2008/0250792 A1 | * | 10/2008 | Wang et al. | 60/806 |
| 2009/0235631 A1 | * | 9/2009 | Bocquet et al. | 60/39.08 |

* cited by examiner

AERONAUTICAL ENGINE WITH COOLING OF AN ELECTRIC STARTING DEVICE

BACKGROUND OF THE INVENTION

The invention relates to the cooling of electric devices for starting aeronautical engines.

A particular field of application of the invention is that of aeronautical engines with a gas turbine, in particular turbo-engines.

The starting of an aeronautical engine is conventionally ensured by an electric machine driving a shaft of the engine. The electric machine may be an electric motor or a machine forming a starter/generator (or S/G) operating in a motor mode upon starting and then in a synchronous generator mode.

It is necessary upon starting to remove the calories produced by the electric starting device, i.e. by the actual electric machine and also preferably by the electronic power circuit used for controlling the electric machine, as for example indicated in document EP 1 953 899.

In an aeronautical engine, the fuel is conventionally used as a coolant fluid either directly or by heat exchange with a heat transfer fluid, for example oil.

The fuel is pumped into a tank and brought to a fuel circuit of the engine which comprises a high pressure pump. The latter delivers fuel under a high pressure to a main circuit for feeding the combustion chamber of the engine. The high pressure pump is typically a gear pump driven from a shaft of the engine via a mechanical transmission box or accessory gear box AGB.

It has been proposed to ensure the cooling of an electric starting device by fuel taken at the outlet of the high pressure pump of the pumping circuit of the engine. In order to ensure a sufficient flow of coolant fuel at a low starting speed, it is necessary to give significant capacity to the high pressure pump. Such a capacity is then widely overdimensioned for providing the flow rate required by the main feeding circuit during the operation of the engine at a rated speed, which imposes diversion of a significant portion of the fuel provided by the high pressure pump in order to return it to low pressure. The use of additional pumps mechanically driven by the engine in order to feed the cooling device of the electric starting device may be contemplated. But such a solution is expressed by an increase in mass, by the requirement of an additional mechanical link with the AGB and poses a problem at high speed by diverting then a too large flow of fuel.

In document U.S. Pat. No. 3,733,816, it has been proposed to cool an electronic calculator of a gas turbine engine by means of fuel provided by a pump located upstream from the high pressure fuel pump, in series with the latter, both pumps being mounted on a common driving shaft coupled with the engine.

OBJECT AND SUMMARY OF THE INVENTION

The goal of the invention is to propose a solution to the problem of cooling the electric starting device, which does not have such drawbacks.

This goal is achieved by means of an aeronautical engine comprising a fuel pumping device including a high pressure pump having an inlet connected to a low pressure fuel conduit and an outlet connected to a main circuit for feeding high pressure fuel, an electric device for starting the engine and a cooling device for the electric starting device connected to the pumping device in order to ensure cooling by circulation of fuel, an engine in which the cooling device is fed with fuel by a pump driven by an electric motor independently of the high pressure pump and having an inlet connected to the pumping device, upstream from the high pressure pump.

The use of such an electric pump gives the possibility of ensuring a sufficient flow rate of cooling fuel at a low speed without overdimensioning the capacity of the high pressure pump and is expressed by less bulkiness and less complex implementation than the addition of a pump mechanically driven by the engine.

Advantageously, the pumping device comprises a low pressure pump driven from a shaft of the engine and having an outlet connected to the inlet of the high pressure pump, and the electric pump feeding the cooling device has its inlet connected to the pumping device between the outlet of the low pressure pump and the inlet of the high pressure pump.

Thus, after starting, when the speed of the engine increases, the electric pump may be disabled, the low pressure pump then being driven at a sufficient speed in order to feed the cooling device efficiently, the cooling being possibly permanently required when the electric starting device is of the S/G type.

Still advantageously, the electric pump feeding the cooling device has an outlet connected to the main circuit for feeding high pressure fuel.

Thus, during the starting phase, the electric pump may contribute to providing a sufficient fuel flow rate to the main fuel feeding circuit. It is then possible to use a high pressure pump of the gear type, but with a lower capacity, or a high pressure pump of the centrifugal type which has a lower mass and more reliability than a gear pump, although it delivers a lower fuel flow at the low starting speed.

According to a particular embodiment, the cooling device comprises a first circuit for circulating a heat transfer fluid connected to the electric starting device, a second circuit for circulating fuel connected to the electric pump feeding the cooling device and a heat exchanger passed through by the first circuit and the second circuit.

The cooling device may be designed so as to cool an electric starter of the electric starting device and an electronic power control circuit of the electric starter.

BRIEF DESCRIPTION OF THE DRAWINGS

The invention will be better understood upon reading the description made hereafter, as an indication but not as a limitation, with reference to the appended drawings wherein.

DETAILED DESCRIPTION OF EMBODIMENTS

Figure 1:
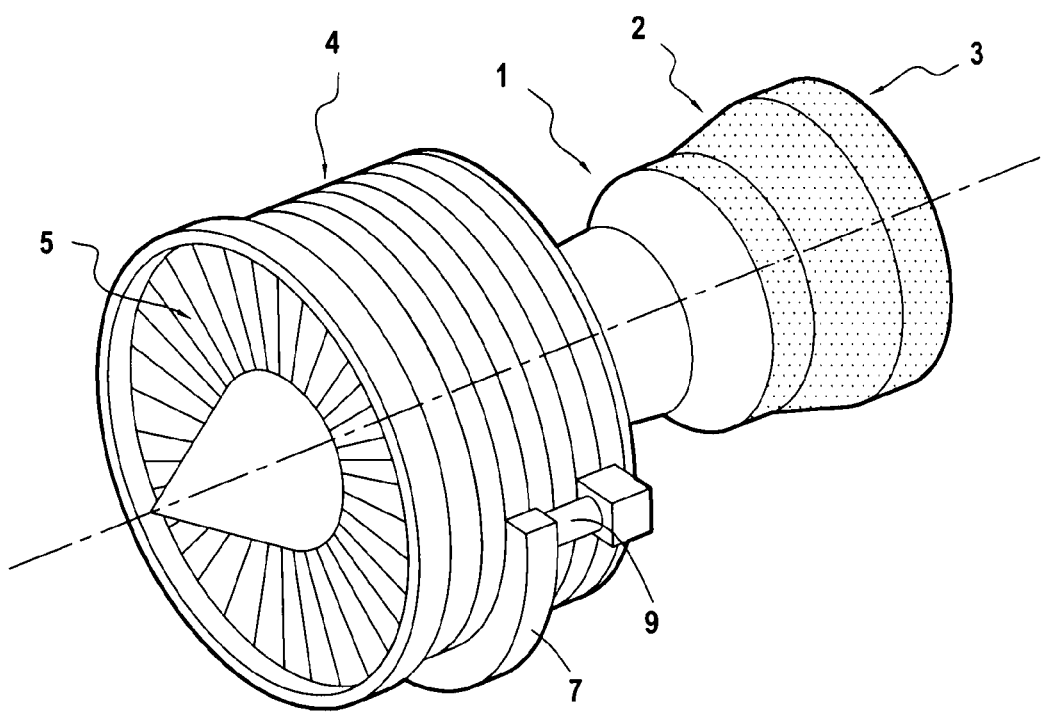
FIG. 1 very schematically illustrates an aeronautical gas turbine engine.

A field of application of the invention is that of aircraft gas turbine engines, such as the one illustrated very schematically in FIG. 1, the invention being however applicable to other aeronautical engines, notably helicopter turbines, as well as to landborne and marine engines.

The engine of FIG. 1 comprises a combustion chamber 1, the combustion gases from the latter driving a high pressure turbine 2 and a low pressure turbine 3. The turbine 2 is coupled through a shaft to a high pressure compressor feeding the combustion chamber with pressurized air while the low pressure turbine is coupled through another shaft to a fan 5 at the inlet of the engine.

A transmission box or accessory gear box AGB 7 is connected through a mechanical power take-off 9 to a turbine shaft and comprises an assembly of gear wheels for mechanical coupling with a certain number of accessories.

Figure 2:
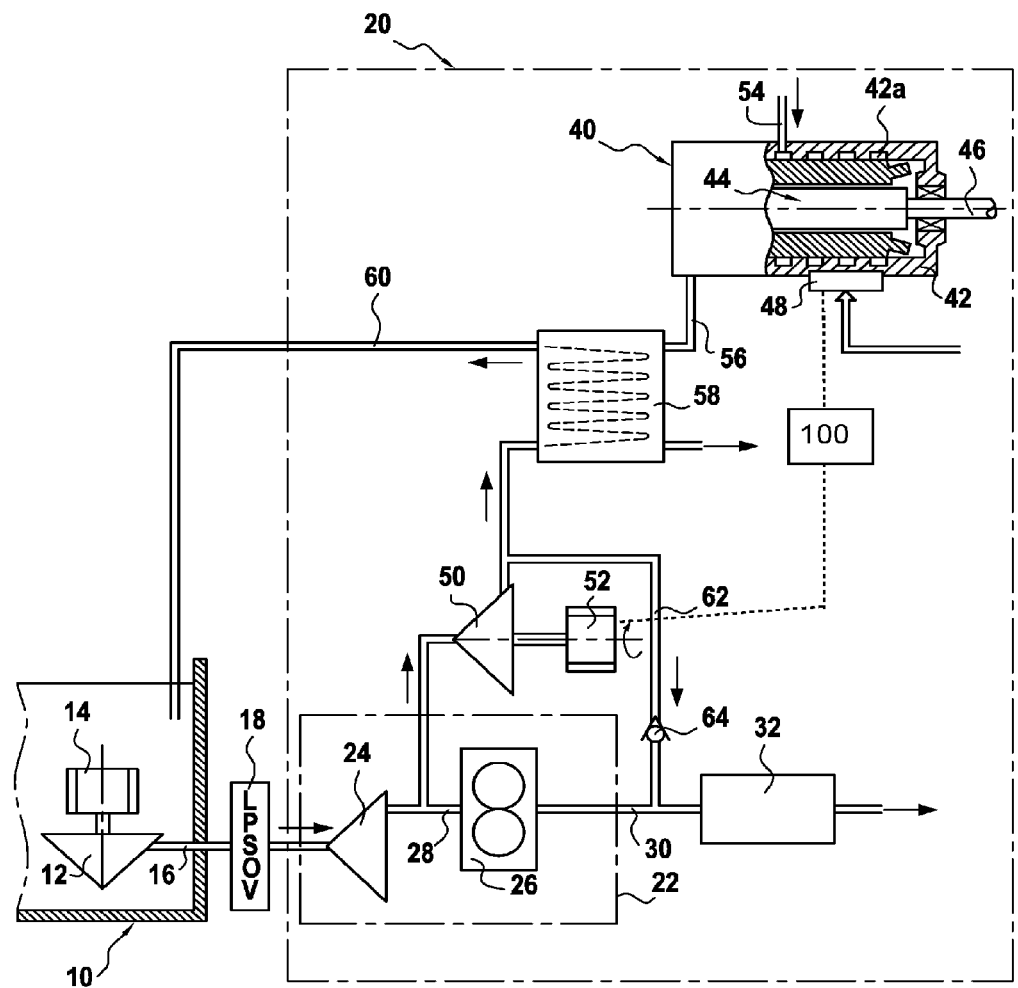
FIG. 2 illustrates an embodiment of the invention.

FIG. 2 is a simplified diagram notably showing an engine portion according to an embodiment of the invention.

The reference 10 designates an aircraft fuel tank with a fuel pump 12 driven by an electric motor 14 and feeding a conduit 16 which conveys fuel to the engine 20. A low pressure shut-off valve 18 (or LPSOV) is interposed on the conduit 16 upstream from the engine 20.

The engine 20 comprises a pumping device 22 providing fuel to a main circuit for feeding the combustion chamber of the engine with high pressure fuel.

For this purpose, the pumping device 22 comprises a low pressure fuel pump 24, the inlet of which is connected to the conduit 16 and the outlet of which is connected to the inlet of a high pressure fuel pump 26 through a conduit 28. The outlet of the high pressure pump 26 is connected to a conduit 30 of the main feeding circuit. A metering device 32 receives the flow of fuel provided by the high pressure pump in order to feed the combustion chamber (not shown) of the engine with a controlled flow rate of high pressure fuel.

The low pressure pump 24 is for example a centrifugal pump mechanically driven via the AGB. The high pressure pump 26 is here a gear pump also mechanically driven via the AGB.

The engine 20 comprises an electric starting device 40, for example of the S/G type. The device 40 is housed in a case 42. It includes an electric machine 44 having a shaft 46 which protrudes out of the case 42 for mechanical coupling with the AGB. In the starting phase, the electric machine operates in a motor mode in order to drive a turbine shaft via the AGB whereas after starting, when the turbine shaft has reached a sufficient speed, the operation of the electric machine is switched to a generator mode. A casing 48 contains the power electronics for controlling the electric machine 44. The casing is electrically connected to an electronic control circuit 100 of the engine. The casing 48 may be attached to the case 42 as illustrated, or be independent of the latter.

According to the invention, the cooling of the electric starting device 40 is ensured by fuel taken in the pumping device by a pump 50 driven by an electric motor 52 itself controlled by the electronic control circuit 100 of the engine, the driving of the pump 50 thus being independent of that of the high pressure pump 26.

In the illustrated example, the cooling is ensured by heat exchange with a heat transfer fluid absorbing calories in the starting device 40.

Channels for circulation of heat transfer fluid 42a are formed in the walls of the case 42 and in proximity to the casing 48. The heat transfer fluid is for example oil also used for lubricating various members including the AGB. The oil circuit with an oil pump (not shown) comprises a conduit 54 which brings the oil to the channels 42a and a conduit 56 which recovers the oil having circulated in the channels 42a and, if necessary, having also been used for lubricating bearings supporting the shaft 46 in the case 42.

The heat exchange between the fuel and the oil is accomplished within an exchanger 58. The exchanger 58 comprises an internal oil circuit which receives the oil from the starting device 40 through the conduit 56 and which returns the cooled oil to the oil circuit, and an internal fuel circuit being part of a fuel circuit 60 which has an inlet connected to the outlet of the pump 50 and an outlet connected to the tank 10.

In the illustrated example, the inlet of the pump 50 is connected to the conduit 28, i.e. between the outlet of the low pressure pump 24 and the inlet of the high pressure pump 26. Thus, after starting, the electric pump 50 may be stopped, the speed of the turbine shaft driving the low pressure pump 24 becoming sufficient for providing the required cooling fuel flow rate in order to efficiently cool the starting device after switching the machine 44 into the generator mode. The stopping of the pump 50 is controlled by disabling the electric motor 52 under the control of the electronic control unit 100 of the engine when the speed of the turbine shaft exceeds a given minimum value.

In the case when the pumping device only comprises a high pressure pump directly fed by the fuel pump of the tank 10, the electric pump 50 is connected to the conduit feeding the high pressure pump.

As shown in FIG. 2, the outlet of the electric pump 50 may also be connected through a conduit 62 to the conduit 30 of the main circuit for feeding pressurized fuel, upstream from the metering device 32. Thus, during the starting phase, the pump 50 may contribute to providing a sufficient flow of fuel to the combustion chamber. As this requirement of providing a sufficient fuel flow rate during the starting no longer is a burden on the high pressure pump 26, it will then advantageously be possible to use for the latter a centrifugal pump rather than a volumetric gear pump. An anti-return valve 64 is mounted on the conduit 62 in order to avoid that after starting, fuel from the high pressure pump 26 flows into the conduit 62.

In the foregoing, a cooling of the starting device by the fuel in an indirect way, via oil acting as a heat transfer fluid was contemplated. Of course it is possible to use another heat transfer fluid, or even directly achieve the cooling of the starting device with the fuel by circulating the fuel in the starting device.

The invention claimed is:

1. An aeronautical engine comprising:
 a pumping device including a low pressure pump and a high pressure pump, an inlet of the high pressure pump connected to an outlet of the low pressure pump via a low pressure fuel conduit and an outlet of the high pressure pump connected to a main fuel circuit for feeding high pressure fuel to a combustion chamber of the engine;
 an electric starting device to start the engine; and
 a cooling device of the electric starting device connected to the pumping device to ensure cooling of the electric starting device by circulation of a heat transfer fluid, wherein the heat transfer fluid is oil, the cooling device including
  a heat exchanger,
  a heat transfer fluid circuit which circulates the heat transfer fluid through the electric starting device and the heat exchanger,
  a cooling fuel circuit distinct from the main fuel circuit for feeding high pressure fuel, in fluid communication with the low pressure fuel conduit of the pumping device and which circulates the fuel through the heat exchanger into a tank, and
  an electric pump driven by an electric motor, the electric pump being disposed in the cooling fuel circuit, the electric pump including an inlet connected to the low pressure fuel conduit of the pumping device, downstream of the low pressure pump and upstream from the high pressure pump, and the electric pump including an outlet in direct fluid communication with an inlet of the heat exchanger,
 wherein a controller of the electric motor is configured to operate the electric motor independently of the high pressure pump such that the fuel circulates through the heat exchanger into the tank via the cooling fuel circuit during operation of the electric pump and to stop operation of the electric pump when a speed of a turbine shaft of the engine is greater than a predetermined value, and wherein the low pressure pump circulates the fuel through the heat exchanger and into the tank via the cooling fuel circuit for cooling the heat transfer fluid and consequently cooling the electric starting device when the speed of the turbine shaft of the engine is greater than the predetermined value.

2. An aeronautical engine according to claim 1, wherein the electric pump feeding the cooling device includes an outlet connected to the main fuel circuit for feeding high pressure fuel.

3. An aeronautical engine according to claim 2, wherein the high pressure pump is a centrifugal pump.

4. An aeronautical engine according to claim 2, wherein an anti-return valve is provided in a conduit connecting the outlet of the electric pump to the main fuel circuit for feeding high pressure fuel.

5. An aeronautical engine according to claim 1, wherein the cooling device is configured to cool an electric starter of the electric starting device and an electronic circuit controlling power of the electric starter.

6. An aeronautical engine according to claim 1, wherein the heat transfer fluid circuit includes a first conduit which brings the heat transfer fluid into circulation channels provided in a wall of a case of the electric starting device and a second conduit which recovers the heat transfer fluid circulated in the circulation channels and passes the recovered heat transfer fluid through the heat exchanger.

* * * * *